(12) United States Patent
Hack et al.

(10) Patent No.: US 10,643,150 B2
(45) Date of Patent: May 5, 2020

(54) PARAMETER VERSION VECTORS USED FOR DETERMINISTIC REPLAY OF DISTRIBUTED EXECUTION OF WORKLOAD COMPUTATIONS

(71) Applicant: International Business Machines Corporation, Armonk, NY (US)

(72) Inventors: Michel H. T. Hack, Cortlandt Manor, NY (US); Yufei Ren, Somers, NY (US); Yandong Wang, Elmsford, NY (US); Li Zhang, Yorktown Heights, NY (US); Wei Zhang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 15/290,630

(22) Filed: Oct. 11, 2016

(65) Prior Publication Data

US 2018/0101790 A1 Apr. 12, 2018

(51) Int. Cl.
*G06N 20/00* (2019.01)
*H04L 29/08* (2006.01)
*G06N 3/02* (2006.01)

(52) U.S. Cl.
CPC ............ *G06N 20/00* (2019.01); *H04L 67/10* (2013.01); *G06N 3/02* (2013.01)

(58) Field of Classification Search
CPC .................................................. G06N 20/00
(Continued)

(56) References Cited

U.S. PATENT DOCUMENTS 8,768,870 B1 *  7/2014 Corrado ................. G06N 20/00
                                                               706/12
9,135,559 B1 *  9/2015 Chan ...................... G06F 16/248
(Continued)

OTHER PUBLICATIONS

Dean et al., "Large Scale Distributed Deep Networks", 2012, In Proceedings of the 25th International Conference on Neural Information Processing Systems—vol. 1 (NIPS'12), F. Pereira, C. J. C. Burges, L. Bottou, and K. Q. Weinberger (Eds.), vol. 1. Curran Associates Inc., USA, 1223-1231. (Year: 2012).*

Shing-Yu Chen, Chi-Neng, Geng-Hau Yang, Wen-Ben Jone and T. Chen, "IMITATOR: A deterministic multicore replay system with refining techniques," Proceedings of Technical Program of 2012 VLSI Design, Automation and Test, Hsinchu, 2012, pp. 1-4. (Year: 2012).*

(Continued)

*Primary Examiner* — James D. Rutten
(74) *Attorney, Agent, or Firm* — Anthony Curro; Ryan, Mason & Lewis, LLP

(57) ABSTRACT

A method includes storing parameter versions utilized by learner instances in each of two or more epochs in a parameter receiving buffer of a parameter server, the learner instances performing distributed execution of workload computations of a machine learning algorithm. The method also includes creating a parameter roster in the parameter server comprising parameter version vectors specifying the parameter versions used by each of the learner instances during each of the two or more epochs. The method further includes generating one or more aggregated parameter sets for storage in an aggregated parameters buffer by aggregating parameter versions from the parameter receiving buffer based on the parameter version vectors in the parameter roster and providing aggregated parameter sets from the aggregated parameters buffer to the learner instances for deterministic replay of the distributed execution of the workload computations of the machine learning algorithm.

20 Claims, 10 Drawing Sheets

(58) Field of Classification Search
USPC .......................................................... 706/12
See application file for complete search history.

(56) References Cited

U.S. PATENT DOCUMENTS

| | | | | | |
|---|---|---|---|---|---|
| 2006/0242654 | A1* | 10/2006 | Lund | ..................... | G06F 9/4491 719/331 |
| 2008/0005522 | A1* | 1/2008 | Paladini | .................. | G06F 12/08 711/170 |
| 2011/0179108 | A1* | 7/2011 | Sorenson | ............ | G06F 16/9535 709/203 |
| 2014/0214954 | A1* | 7/2014 | Mallet | ..................... | G06Q 50/01 709/204 |
| 2015/0324690 | A1* | 11/2015 | Chilimbi | .................. | G06N 3/08 706/25 |
| 2016/0078361 | A1* | 3/2016 | Brueckner | .............. | H04L 67/10 706/12 |
| 2016/0232445 | A1* | 8/2016 | Srinivasan | ........... | G06N 3/0472 |

OTHER PUBLICATIONS

T. Bergan et al., "CoreDet: A Compiler and Runtime System for Deterministic Multithreaded Execution," 15th International Conference on Architectural Support for Programming Languages and Operating Systems (ASPLOS), Mar. 13-17, 2010, pp. 53-64.

H. Cui et al., "Stable Deterministic Multithreading through Schedule Memoization," 9th USENIX Symposium on Operating Systems Design and Implementation (OSDI), Oct. 4-6, 2010, pp. 207-221, vol. 10.

T. Liu et al., "DTHREADS: Efficient Deterministic Multithreading," 23rd ACM Symposium on Operating Systems Principles (OSP), Oct. 23-26, 2011, pp. 327-336, Cascais, Portugal.

H. Cui et al., "PARROT: A Practical Runtime for Deterministic, Stable, and Reliable Threads," 24th ACM Symposium on Operating Systems Principles (SOSP), Nov. 3-6, 2013, pp. 388-405.

* cited by examiner

100

500

600

700

900

1000

PARAMETER VERSION VECTORS USED FOR DETERMINISTIC REPLAY OF DISTRIBUTED EXECUTION OF WORKLOAD COMPUTATIONS

BACKGROUND

The present application relates to computation, and more specifically, to replay of computations. Various applications rely on input data and model parameters to conduct computation. Models in the form of mathematical equations and logic with parameters may be trained to find appropriate values of the parameters such that the models provide accurate predictions.

SUMMARY

Embodiments of the invention provide techniques for deterministic replay of distributed executions of workload computations utilizing parameter version vectors.

For example, in one embodiment, a computer-implemented method comprises storing parameter versions utilized by two or more learner instances in each of two or more epochs in a parameter receiving buffer of a parameter server, the two or more learner instances performing distributed execution of workload computations of a machine learning algorithm. The method also comprises creating a parameter roster in the parameter server comprising parameter version vectors specifying the parameter versions used by each of the two or more learner instances during each of the two or more epochs. The method further comprises generating one or more aggregated parameter sets for storage in an aggregated parameters buffer by aggregating parameter versions from the parameter receiving buffer based on the parameter version vectors in the parameter roster and providing aggregated parameter sets from the aggregated parameters buffer to the two or more learner instances for deterministic replay of the distributed execution of the workload computations of the machine learning algorithm.

In another embodiment, a computer-implemented method comprises instantiating a learner instance with a given learner identifier, obtaining an epoch execution history, for the given learner identifier, of a distributed execution of workload computations of a machine learning algorithm for two or more epochs, and performing deterministic replay of the distributed execution of workload computations of the machine learning algorithm for the given learner identifier using the learner instance. Performing the deterministic replay comprises, in each epoch of the epoch execution history, obtaining one or more aggregated parameter sets for the given learner identifier for that epoch from one or more parameter servers, performing workload computations for that epoch using the learner instance and the one or more aggregated parameter sets for that epoch, and providing new local parameter information to the one or more parameter servers.

In another embodiment, a system comprises one or more parameter servers and two or more learner instances for performing distributed execution of workload computations of a machine learning algorithm for two or more epochs. Each of the one or more parameter servers is configured to receive parameter versions utilized by each of the two or more learner instances in each of the two or more epochs, to store parameter versions utilized by two or more learner instances in each of the two or more epochs in a parameter receiving buffer, to create a parameter roster comprising parameter version vectors specifying the parameter versions used by each of the two or more learner instances during each of the two or more epochs, to generate one or more aggregated parameter sets for storage in an aggregated parameters buffer by aggregating parameter versions from the parameter receiving buffer based on the parameter version vectors in the parameter roster, and to provide aggregated parameter sets from the aggregated parameters buffer to the two or more learner instances for deterministic replay of the distributed execution of the workload computations of the machine learning algorithm. Each of the two or more learner instances is configured to perform deterministic replay of the distributed execution of the workload computations of the machine learning algorithm by obtaining an epoch execution history for a given learner identifier and, in each epoch of the epoch execution history, obtaining one or more aggregated parameter sets for the given learner identifier for that epoch from one or more parameter servers, performing the workload computations for that epoch using the one or more aggregated parameter sets for that epoch, and providing new local parameter information to the one or more parameter servers.

These and other illustrative embodiments include, without limitation, methods, apparatus, systems and computer-readable storage media.

DETAILED DESCRIPTION

Illustrative embodiments of the invention may be described herein in the context of illustrative methods, systems and devices for deterministic replay of computations. However, it is to be understood that embodiments of the invention are not limited to the illustrative methods, systems and devices but instead are more broadly applicable to other suitable methods, systems and devices.

Figure 1:
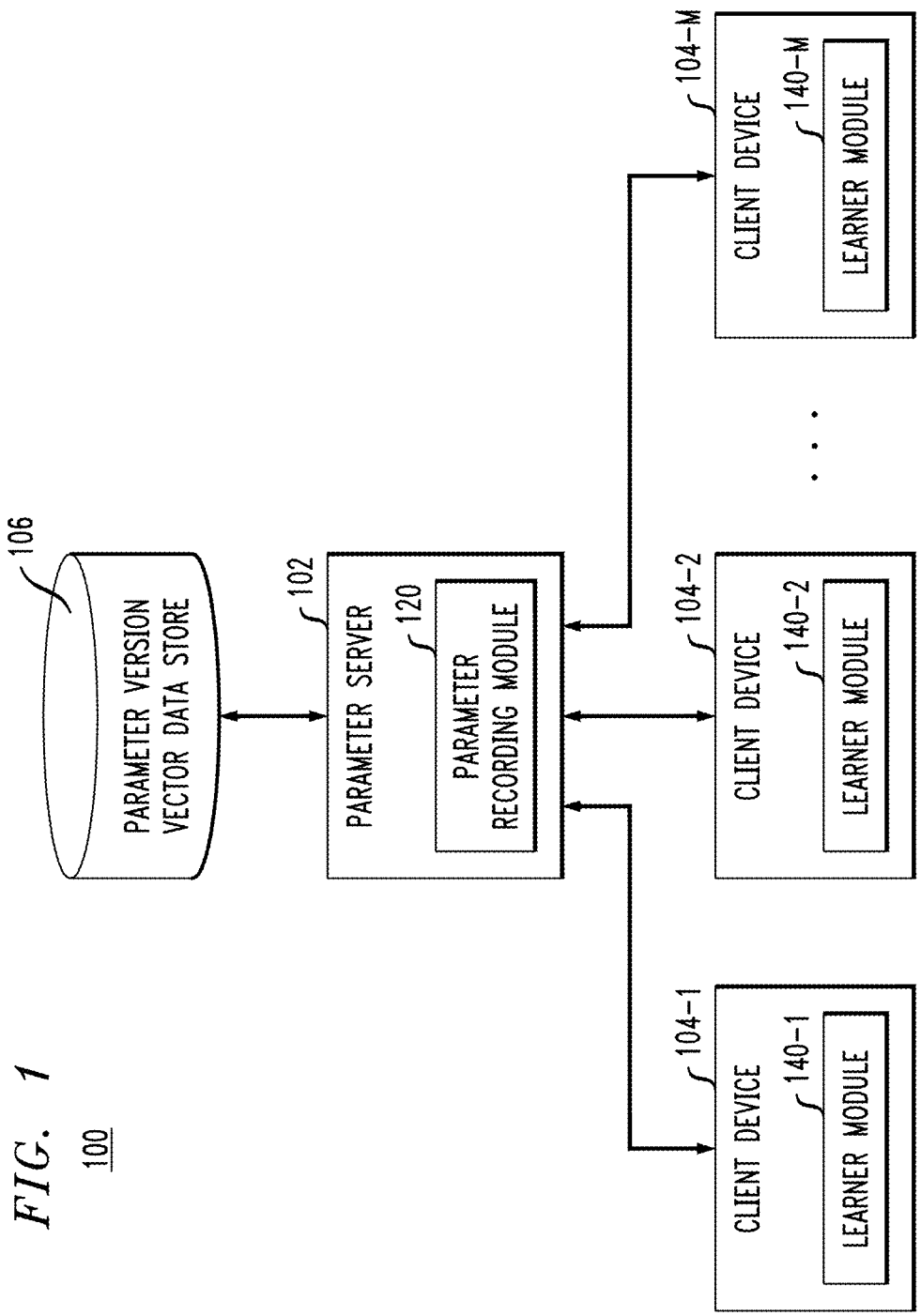
FIG. 1 depicts a system for deterministic replay of computations, according to an embodiment of the present invention.

FIG. 1 shows a system 100 for deterministic replay of computations. The system 100 includes parameter server 102, client devices 104-1, 104-2, . . . 104-M collectively referred to herein as client devices 104, and parameter version vector data store 106. As shown, the parameter server 102 implements a parameter recording module 120 and the client devices 104 implement respective learner modules 140-1, 140-2, . . . 140-M collectively referred to herein as learner modules 140. The learner modules 140 of client devices 104, in some embodiments, facilitate distributed computation of a workload. The parameter recording module 120 of parameter server 102 records parameter sets utilized by the learner modules 140 of client devices 104 in multiple epochs of computation of the workload to facilitate deterministic replay of workload computations. The parameter version vector data store 106 can provide storage for parameter rosters, parameter receiving buffers and aggregated parameter buffers as will be described in further detail below.

The client devices 104 and their associated learner modules 140 are also referred to as learners in the description below. While various embodiments are described herein that utilize three learners, this is not a requirement. The number of learners used may be more or less than three as needed or desired for a particular implementation.

Although the parameter version vector data store 106 is shown as external to the parameter server 102 in FIG. 1, this is not a requirement. In other embodiments, the parameter version vector data store 106 may be implemented at least partially internal to the parameter server 102 and/or one or more of the client devices 104.

While FIG. 1 shows an arrangement with a single parameter server 102, embodiments are not so limited. In some embodiments, multiple parameter servers may provide parameter sets to the learners 104. In workloads or computation involving large numbers of parameters, it may be desired to scale up the number of parameter servers and to distribute handling of aggregation of parameters amongst multiple parameter servers. In arrangements with multiple parameter servers, the parameters are distributed. With multiple learners 104, the training data may be distributed amongst the different learners 104.

One or more of parameter server 102, client devices 104 and parameter version vector data store 106 in system 100 may be implemented or otherwise be part of a computing node, cloud computing environment or other processing platform as will be discussed in further detail below with respect to FIGS. 11-13.

Figure 2:
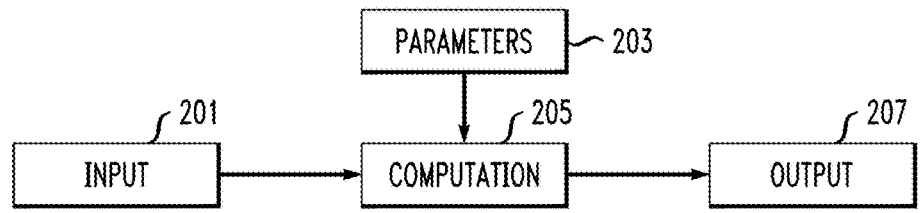
FIG. 2 depicts a system for computation, according to an embodiment of the present invention.

Many large-scale data-intensive applications rely on both input data and a large number of model parameters to conduct computation. Such applications include but are not limited to machine translation of text and image recognition. In these and other applications, distributed machine learning (ML) algorithms may be used to facilitate the large-scale data-intensive computations. ML algorithms generate models, which may include sets of equations with parameters, to fit training data. The models created using such ML algorithms are then used to generate predictions. ML algorithms include but are not limited to neural networks, deep learning, support vector machines (SVMs), factorization machines, Bayesian networks, etc. Model training can be important to find appropriate values of the model parameters such that the models generated using ML provide accurate predictions. FIG. 2 depicts a system 200 for computation which may be implemented using ML algorithms, where input 201 and parameters 203 are used in computation 205 to provide output 207.

Figure 3:
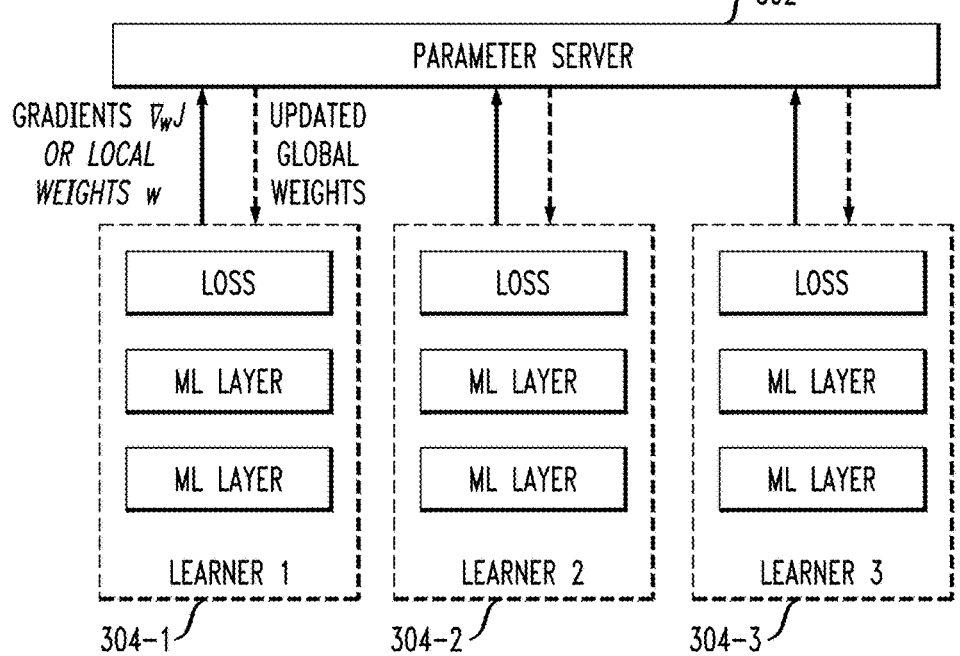
FIG. 3 depicts distributed parameter management, according to an embodiment of the present invention.

FIG. 3 shows a system 300 for distributed parameter management. The system 300 shows parameter server 302 and learners 304-1, 304-2 and 304-3 collectively referred to herein as learners 304. Each learner 304 may implement a different model instance for computation of a workload that is distributed amongst the learners 304. The learners 304 may be distributed amongst different compute instances, such as different central processing units (CPUs), graphics processing units (GPUs) or other different physical or virtual machines. The learners 304 each implement multiple ML layers and a loss layer. In some embodiments, the ML layers are used for model training while the loss layer is used for evaluating model quality.

ML algorithms can leverage a large number of workers, such as the different learners 304 shown in system 300, to concurrently train models that utilize large numbers of parameters, such as millions or even billions of parameters. To facilitate parameter exchange among the different learners 304, the parameter server 302 is utilized which provides a centralized place for the different learners 304 to get the latest aggregated parameters. The parameter server 302 collects parameters from respective ones of the learners 304, conducts aggregation, and sends the aggregated parameters back to respective ones of the learners 304. The parameter server 302 may implement push and pull interfaces. For example, push interfaces may be used to distribute aggregated parameters to the learners 304 periodically. Pull interfaces may also be used to distribute aggregated parameters to respective ones of the learners 304 on request. The push and pull interfaces may also be used by the parameter server 302 in collecting parameters from the learners 304.

As shown in FIG. 3, the learners 304 provide gradients $\nabla_w J$ or local weights w to the parameter server 302. The parameter server 302 conducts aggregation of the local weights w or gradients $\nabla_w J$ to calculate global weights. The aggregation or calculation of global weights by parameter server 302 may utilize Downpour Stochastic Gradient Descent (SGD), Elastic Averaging SGD (EASGD), Adaptive Revision (AdaRevision), weight averaging or combinations of these and other techniques. The parameter server 302 then provides updated global weights to the learners 304.

In some embodiments, it is desired to add discipline or structure in parameter training to facilitate debugging and testing to provide deterministic replay of computations by the learners 304.

Figure 4:
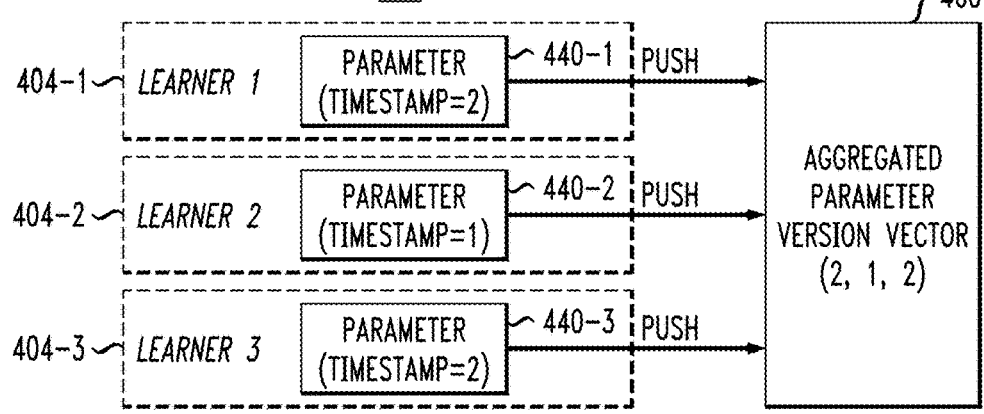
FIG. 4 depicts parameter aggregation, according to an embodiment of the present invention.

To keep track of the aggregated parameters and to offer fault tolerance, a parameter server such as parameter server 102 or 302 may use version vectors or vector clocks to manage aggregated parameters. A version vector includes timestamps or versions of the parameters received from different learners. Each push or update from a learner carries the timestamp or version of the parameter or parameter set from the learner. After each push, the learner increments internal timestamps monotonically. FIG. 4 illustrates an example of parameter aggregation 400. As shown, learners 404-1, 404-2 and 404-3 collectively referred to herein as learners 404 provide parameters 440-1, 440-2 and 440-3, respectively, to a parameter server such as parameter server 102 or 302 to facilitate generation of an aggregated parameter version vector 460. As shown, learner 1 404-1 provides parameter 440-1 with timestamp 2, learner 2 404-2 provides parameter 440-2 with timestamp 1, and learner 3 404-3 provides parameter 440-3 with timestamp 2. The aggregated parameter version vector is thus (2, 1, 2) indicating the timestamps for learners 404-1, 404-2 and 404-3, respectively. The timestamps or versions in the parameters 440 indicate, for each learner 404, which iteration that learner is currently computing or processing.

Distributed parameter management may proceed synchronously or asynchronously. In synchronous execution, each learner conducts training in a lockstep manner, such that no single learner is ahead of the others in terms of its epoch or timestamp. On the parameter server side, synchronous execution requires the parameter server to wait for the arrival of all the parameters of a specific epoch before carrying out aggregation. To send out aggregated parameters, the version vectors of the aggregated parameters are larger than the one carried with the pull command. In this context, larger is defined as VV(a)>VV(b) if and only if VV(a)$_i$ is larger than VV(b)$_i$ for all element indices i in the version vectors (VV). On the client side, synchronous execution requires that each client or learner perform execution in a strict serialized order involving: (1) computation, (2) pushing local parameters, (3) pulling the latest aggregated parameters and (4) looping from (1). Synchronous execution can be slow, due in part to differing capabilities or processing loads on the client devices implementing different learners. Synchronous execution thus proceeds only as quickly as the slowest learner in each iteration, which may lead to inefficient use of computing resources.

To mitigate the impact of stragglers or slow learners in large-scale computing environments, asynchronous execution may be used in some embodiments to deliver efficient performance. When errors occur during asynchronous execution, however, it is challenging to identify the bugs due to unrepeatable execution environments caused by the stragglers or comparatively slow learners. A learner, for example, is not necessarily repeatedly slow or fast thus making repeatability of asynchronous execution difficult. A physical or virtual machine implementing a learner in one execution may be slowed due to various issues such as resource contention with other tasks, network traffic, etc. Many times, such slowdowns are temporary and not repeatable and as a result re-execution for debugging or other purposes can cause non-deterministic results. To address these and other issues, some embodiments implement version vector based deterministic replay in parameter sensitive applications that follow synchronous or asynchronous execution during an initial or previous run or computation.

Asynchronous execution may be used to avoid the waiting in each epoch for relatively slow learners. On the parameter server side, synchronous execution involves waiting for the arrival of all the parameters from all the learners which can be time-consuming. On the client or learner side, synchronous execution involves waiting for the arrival of the latest parameters which can also degrade performance. For asynchronous execution on the parameter server side, the constraint that aggregation only happens after all parameters are collected from the learners is relaxed. In asynchronous execution the parameter server can carry out aggregation when some proportion of the parameters are received from the learners and then send aggregated parameters out to clients or learners. The proportion may vary as desired for a particular implementation. In some embodiments, aggregation is carried out when 70% of the parameters are received from the different learners. In other embodiments, aggregation may be carried out when more or less than 70% of the parameters are received by the parameter server. Also, aggregation may be triggered based on time, such as after a designated period of time from the last aggregation rather than or in addition to aggregation triggered based on receiving a specified portion of the parameters. For asynchronous execution on the client or learner side, a learner can continue training without waiting for the arrival of the latest aggregated parameters. For example, various ML algorithms can tolerate the use of out-of-date parameters facilitating asynchronous execution.

To facilitate asynchronous execution, some embodiments utilize various rules and conditions for determining when to perform aggregation as well as when to provide aggregated parameters to the learners. Version vectors are used in some embodiments to keep track of which learner is using which parameters at a given time.

In some embodiments, rules control when the parameter server performs aggregation. An aggregator in the parameter server can check an aggregation condition based on an intermediate version vector. The condition, in some embodiments, is based on the number of updated epochs, denoted $\Delta$. Aggregation is triggered when $\Delta = N \times \lambda$, where $0 \leq \lambda \leq 1$ and 1 indicates synchronous execution and N denotes the number of different learners.

In some embodiments, the above-described trigger rule may be modified to wait a predetermined time after the trigger condition is met. Assume, for example that there are 10 learners and that aggregation is triggered when $\lambda$ is 7. Aggregation may wait for a predetermined time t after this trigger condition is met before performing aggregation so as to ensure that if any of the three remaining learners provides parameters within time t those parameters would be included in aggregation. The waiting time t can be useful in situations where learners provide updated local weights or gradients quickly after one another—for example, if the last three learners provided updated local weights or gradients mere seconds or less than time t after the trigger condition is met such updated local weights or gradients would still be used in the next set of aggregated parameters.

To facilitate asynchronous execution, some embodiments utilize additional rules for determining what data to return back to learners given a learner's request, e.g., based on the epoch and the learner's most recent version vector. Each pull carries a version vector along with the local epoch for a learner. The parameter server, in some embodiments, returns a new aggregated parameter back to the client or learner when the version vector of the aggregated parameters satisfies specified comparison conditions. Comparison conditions include but are not limited to sending updates when the aggregated parameters are newer by a threshold number of generations or epochs, sending updates when the most recent version for a learner is older than a specified threshold, etc.

For synchronous execution, the same parameter aggregation rules may be used. Thus, while various embodiments are described with respect to asynchronous execution, the techniques described may also be used in synchronous execution. It is also possible that a given workload computation involves partially synchronous and partially asynchronous execution. In some epochs, the learners may operate synchronously while in other epochs different learners may be asynchronous due to variations in processing load of physical or virtual machines implementing the learners, network congestion, etc.

Figure 5:
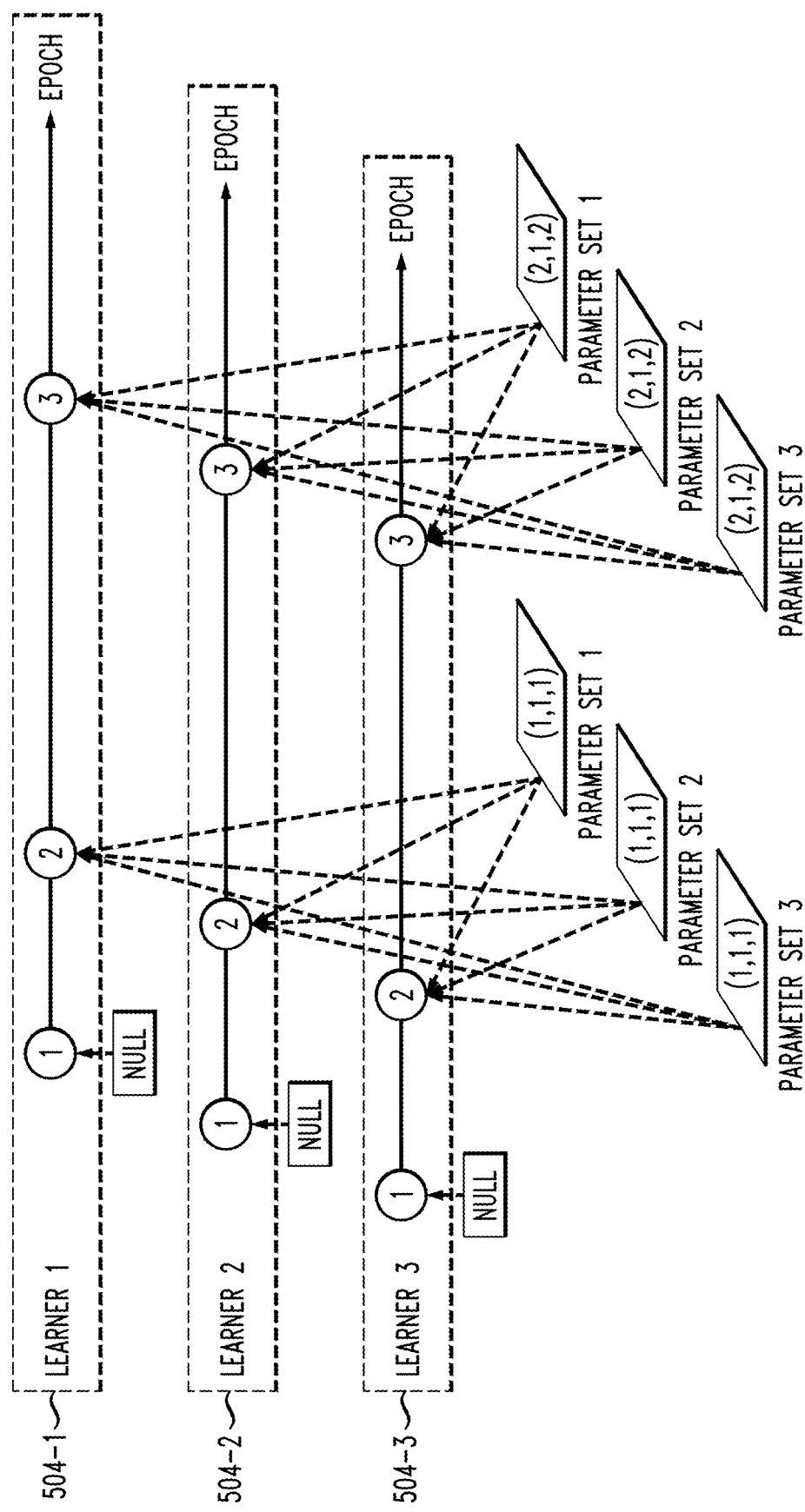
FIG. 5 depicts asynchronous execution of computations by multiple learners, according to an embodiment of the present invention.

FIG. 5 depicts a system 500 for conflict-free asynchronous execution of computations by multiple learners 504-1, 504-2 and 504-3 collectively referred to herein as learners 504. As shown, the learners progress through epochs of computation denoted 1, 2 and 3. In epoch 1, each of the learners 504-1 receives null parameters as epoch 1 is the first epoch. In epoch 2, parameter sets 1, 2 and 3 are provided to the learners 504 from respective different parameter servers not explicitly shown in FIG. 5.

In epoch 3, parameter sets 1, 2 and 3 are again provided to each of the learners 504 from respective different parameter servers. In this epoch, however, learner 504-2 is slow, indicating that the learner 504-2 did not finish or otherwise provide local parameter updates to the parameter servers in time for the next update or distribution of the aggregated parameter set.

Rather than waiting for learner 504-2, the parameter servers provide aggregated parameter sets for version vector (2, 1, 2) for the parameter sets 1, 2 and 3 to each of the learners 504. Thus, learners 504-1 and 504-3 can begin computation for epoch 3 without having to wait for learner 504-2 to provide epoch 2 parameters to the different parameter servers. When the learners 504 conduct computation, the version of different dimensions within a version vector can be different, such as in epoch 3 wherein it is valid to have versions (2, 1, 2) from learners 504-1, 504-2 and 504-3, respectively. As mentioned above, "slow" learners can be caused by one of or a confluence of factors such as slow machines, network congestion, etc.

For correct execution, each of the learners 504 uses the same version vectors for the different parameter sets 1, 2 and 3. For learner 504-2, for example, the version vector is (2, 1, 2) and thus that learner is provided with parameter versions (2, 1, 2) for each of the parameter sets 1, 2 and 3. Although FIG. 5 illustrates an example wherein each of the learners 504 utilizes the same version vector, this is not a requirement. Different ones of the learners 504, for example, can use different version vectors so long as the parameter sets 1, 2 and 3 used by a particular learner have the same version vector. As an example, learner 504-1 could utilize a version vector (2, 2, 1) while learner 504-2 utilizes the version vector (2, 1, 2). In this example, the learner 504-1 would receive from the parameter servers the version vector (2, 2, 1) for parameter sets 1, 2 and 3 while the learner 504-2 would receive from the parameter servers the version vector (2, 1, 2) for parameter sets 1, 2 and 3.

Deterministic replay of an asynchronous execution of computations for a workload is a difficult task. Deterministic replay is useful in a number of tasks, including debugging, testing, reproducing errors, etc. Embodiments provide techniques which permit for deterministic replay of asynchronous execution of the computations for a workload. Version vectors used for the computations are logged, and version vector based replay is used to offer deterministic re-execution of the computations for the workload. Thus, regardless of how the original workload was executed asynchronously, deterministic results may be provided during replay. To implement deterministic replay, embodiments in a first execution log the version vectors of parameters that are used by the different learners. During replay, the learners rewind the log and rely on the specific parameters to conduct recomputations according to the version vectors. Parameter servers generate version dependency graphs to re-create all necessary aggregated parameters along the replay. The deterministic replay may, in some cases, be slower than the first execution as it requires following the version vectors and learners may not be repeatedly slow as discussed above.

Figure 6:
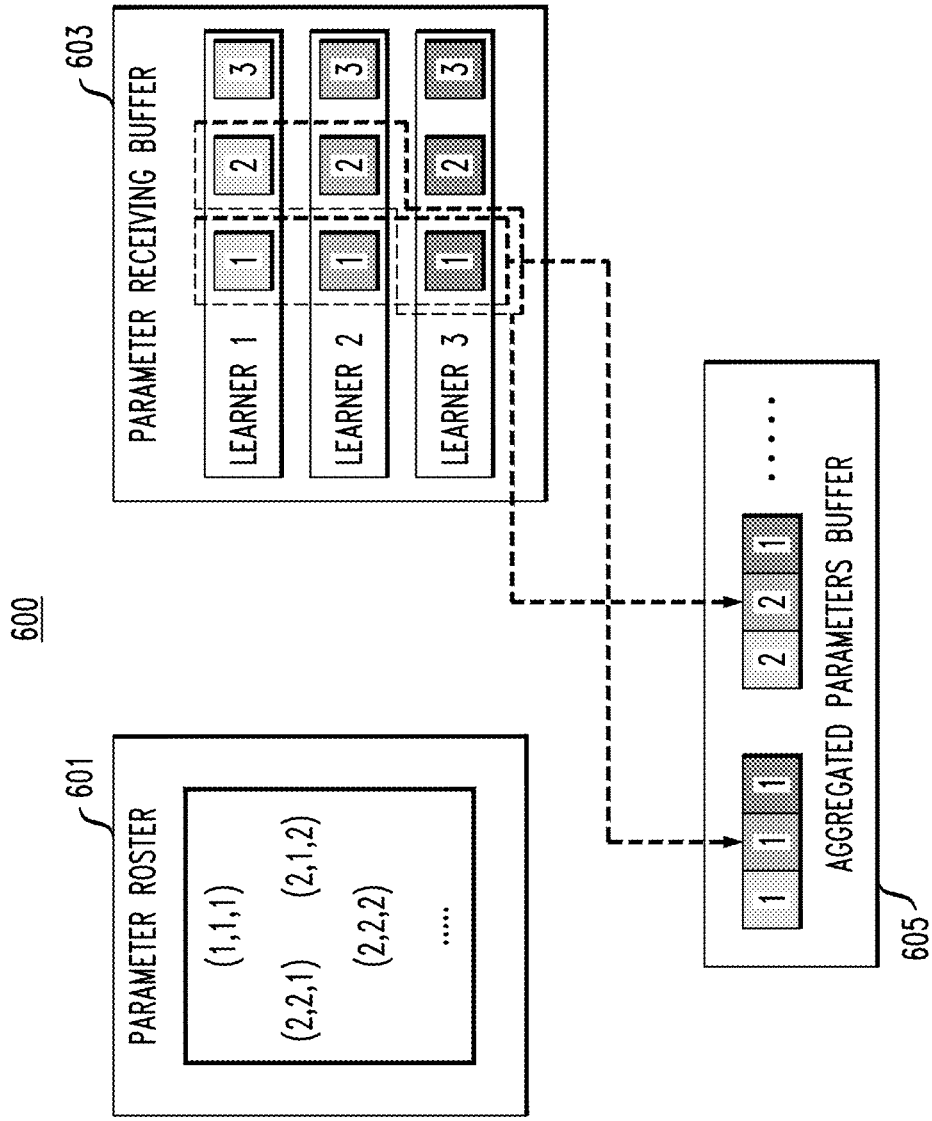
FIG. 6 depicts a parameter server implementation of deterministic replay, according to an embodiment of the present invention.

FIG. 6 shows an implementation 600 for deterministic replay in a parameter server such as parameter server 102 or 302 including a parameter roster 601, a parameter receiving buffer 603 and an aggregated parameters buffer 605. On each parameter server, a multi-learner parameter receiving buffer 603 is created to hold the parameters of different epochs from different learners. The FIG. 6 example shows parameters for epochs 1, 2 and 3 being stored for learner 1, learner 2 and learner 3. It is to be appreciated, however, that the numbers of learners and epochs may vary. Also shown in FIG. 6 is a parameter roster 601, which is the set of all parameter vectors that have been used by the learners in past epochs. The parameter roster 601 keeps track of the versions of all the aggregated parameters. As indicated above, different learners can use parameter sets of different versions, so it is possible for a parameter server to generate different version vectors for a particular epoch. The parameter roster 601 is generated from parameter server execution history, which collects all the necessary parameter versions based on the version vectors. The parameter versions used by all the learners are merged to form the parameter roster 601.

The parameter server generates the aggregated parameters buffer 605 according to the parameter roster 601 and the received incoming parameters from different learners stored in the parameter receiving buffer 603. The aggregated parameters buffer 605 includes aggregated parameter sets for each version vector stored in the parameter roster 601, although aggregated parameter sets may be removed or deleted from the aggregated parameters buffer 605 when they are no longer needed as will be described in further detail below. The parameter server serves parameter retrieving requests from the learners out of the aggregated parameters buffer 605.

The parameter roster 601, in some embodiments, stores the valid version vectors for respective epochs. The aggregated parameters buffer 605 includes parameter sets for the version vectors used in particular epochs. A first parameter set is formed from the version vector (1, 1, 1) and includes the parameters from learners 1, 2 and 3, respectively, in epoch 1. A second parameter set is formed from the version vector (2, 2, 1) and includes the parameters from learners 1 and 2 in epoch 2 and from learner 3 in epoch 1. In this instance, learner 3 is a slow learner. Although not explicitly shown for clarity, the aggregated parameters buffer 605 would further include parameter sets for each other version vector in the parameter roster 601. As will be described in further detail below with respect to FIG. 8, parameter sets stored in the aggregated parameters buffer 605 may be deleted under certain conditions.

Figure 7:
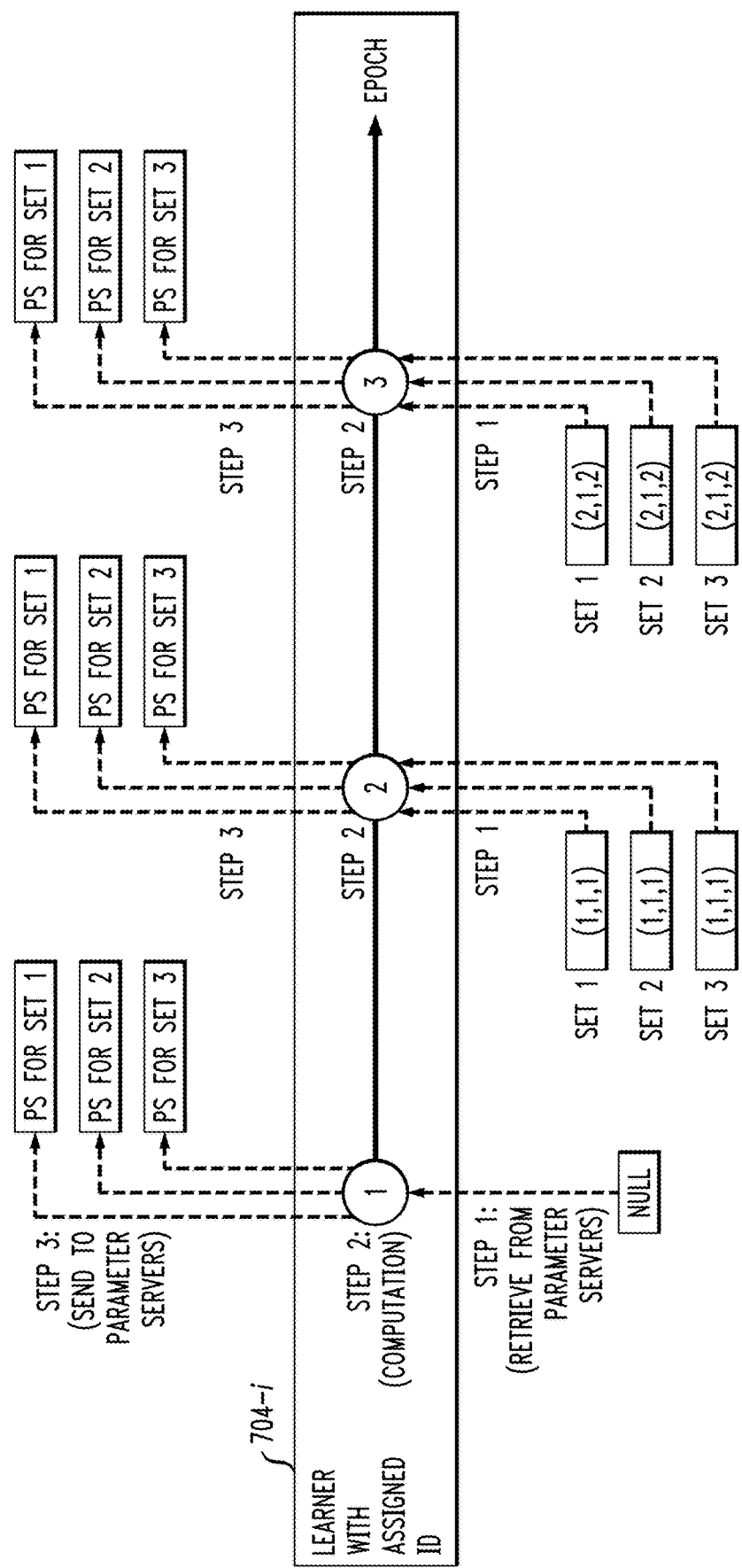
FIG. 7 depicts client side implementation of deterministic replay, according to an embodiment of the present invention.

FIG. 7 shows an implementation 700 for deterministic replay in a client or learner denoted 704-*i*. FIG. 7 more particularly shows deterministic replay of the computation workload shown in FIG. 5. The learner 704-*i* is launched, during replay, with a particular learner identifier (ID). The learner 704-*i* during replay retrieves the epoch execution history for its learner ID along with the parameter server dependency list. During replay, each learner such as learner 704-*i* can obtain the epoch execution history and parameter server dependency lists, or information used to derive the epoch execution history and parameter server dependency lists, from log files generated during previous runs. Such log files may be stored in a shared file system or data store that is accessible by each of the learners. Using the log files, the epoch execution history and parameter server dependency lists can be obtained or generated at the beginning of re-execution.

The learner 704-*i*, in each epoch, performs steps 1-3 as shown in FIG. 7. In the first step, the learner 704-*i* moves to the new epoch and waits for the readiness of the dependent parameter sets. In epoch 1, no waiting is necessary as the parameter sets are initially NULL. More generally, step 1 in each epoch involves the learner 704-*i* retrieving the parameter set by explicitly specifying which version of the parameters it wants to pull from the respective parameter servers. In step 2, the computation for the current epoch is conducted. In step 3, new local parameters are provided to each of the parameter servers. In the FIG. 7 example, similar to the FIG. 5 example, there are three parameter servers and thus three parameter sets. Each transfer in step 3 carries the epoch from which the learner 704-*i* generates the parameters. Although not shown in FIG. 7 for clarity, multiple learners are invoked with different IDs to replicate a previous computation or workload.

Steps 1-3 are repeated as shown in FIG. 7 for epochs 2 and 3. In epoch 2, the learner 704-*i* in step 1 obtains parameter sets 1, 2 and 3 from the different parameter servers where each parameter set has the version vector (1, 1, 1) as shown in the FIG. 5 example. Computation for epoch 2 is performed in step 2 and new local parameters are provided to the parameter servers in step 3.

In epoch 3, steps 1-3 are again repeated as shown. In epoch 3, however, the parameter sets 1, 2 and 3 from the parameter servers use version vectors (2, 1, 2), as learner 2 was a slow learner in epoch 2 in the FIG. 5 example being replayed.

Figure 8:
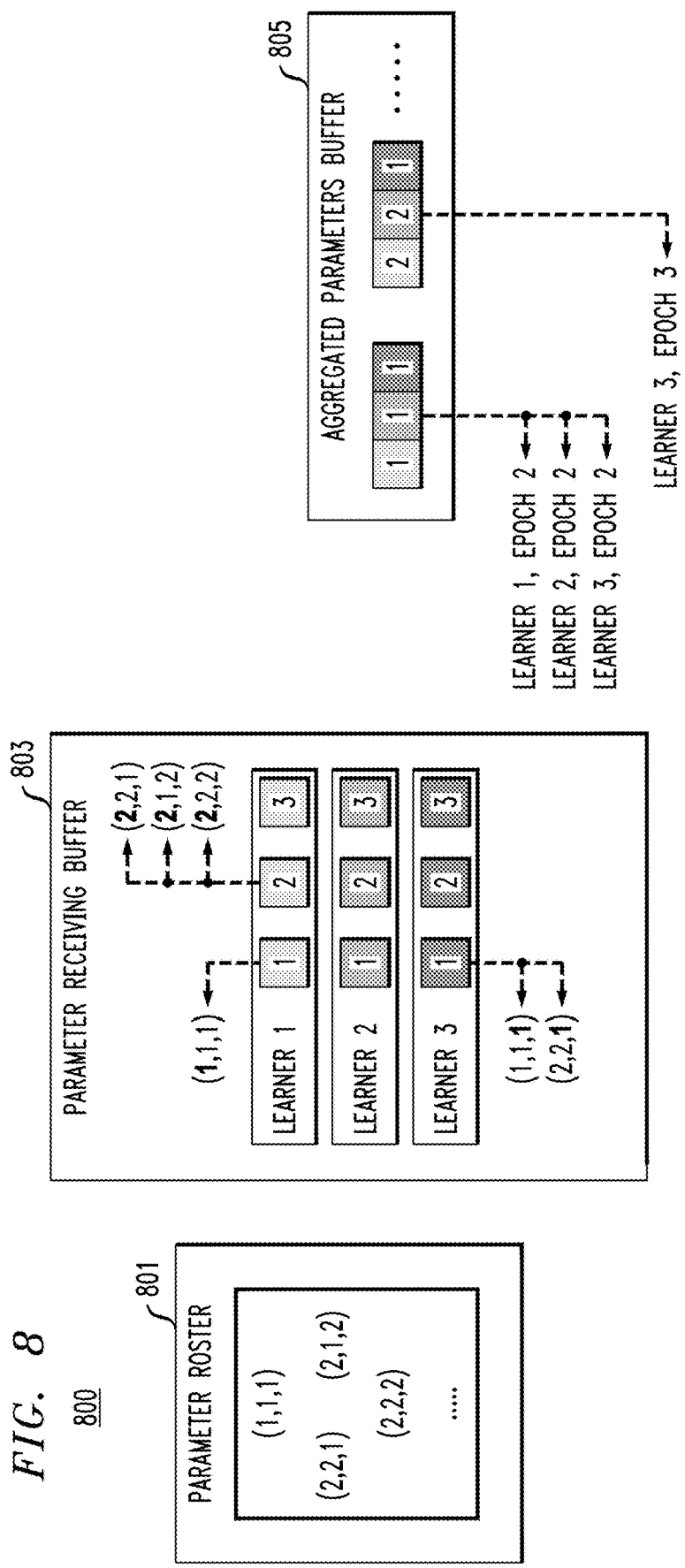
FIG. 8 depicts management of parameters in a parameter server, according to an embodiment of the present invention.

FIG. 8 depicts an implementation 800 of management of parameters in a parameter server such as parameter server 102 or 302. The implementation 800, similar to implementation 600 in FIG. 6, includes a parameter roster 801, parameter receiving buffer 803 and aggregated parameters buffer 805. To detect when it is safe to remove buffered received parameters and aggregated parameters, dependency relationships between version vectors with corresponding parameters sets may be generated. As shown in FIG. 8, for example, parameter set 1 from learner 1 is needed by version vector (1, 1, 1), the parameter set 1 from learner 3 is needed by version vectors (1, 1, 1) and (2, 2, 1) and the parameter set 2 from learner 1 is needed by the version vectors (2, 2, 1), (2, 1, 2) and (2, 2, 2). Such dependences may be retrieved by checking the parameter roster 801. Similarly, aggregate parameters in the aggregated parameters buffer 805 may be needed by different learners in different epochs. As shown in FIG. 8, for example, the aggregated parameter set for version vector (1, 1, 1) is needed by learners 1, 2 and 3 in epoch 2 and the aggregated parameter set for version vector (2, 2, 1) is needed by learner 3 in epoch 3.

When an aggregated parameter set is generated, the edge connecting the received parameter set (from a learner) to the dependent vector is removed. When no more edges connect to a received parameter set in the parameter receiving buffer 803, that received parameter set can be removed. In the FIG. 8 example, the parameter set 1 from learner 1 can be deleted from the parameter receiving buffer 803 after the aggregated parameter set for version vector (1, 1, 1) is generated and stored in the aggregated parameters buffer 805. Similarly, the parameter set 1 from learner 3 can be deleted from the parameter receiving buffer 803 after the aggregated parameter sets for version vectors (1, 1, 1) and (2, 2, 1) are generated and stored in the aggregated parameters buffer 805. The parameter set 2 from learner 1 can be deleted from the parameter receiving buffer 803 after the aggregated parameter sets for version vectors (2, 2, 1), (2, 1, 2) and (2, 2, 2) are generated and stored in the aggregated parameters buffer 805.

In a similar manner, the aggregated parameters buffer 805 can be managed. When all the learner-epochs that depend on an aggregated parameter set have been served, that aggregated parameter set can be deleted from the aggregated parameters buffer 805. In the FIG. 8 example, the aggregated parameter set for version vector (1, 1, 1) can be deleted from the aggregated parameters buffer 805 after epoch 2. The aggregated parameter set for version vector (2, 2, 1) can be deleted from the aggregated parameters buffer 805 after epoch 3.

Figure 9:
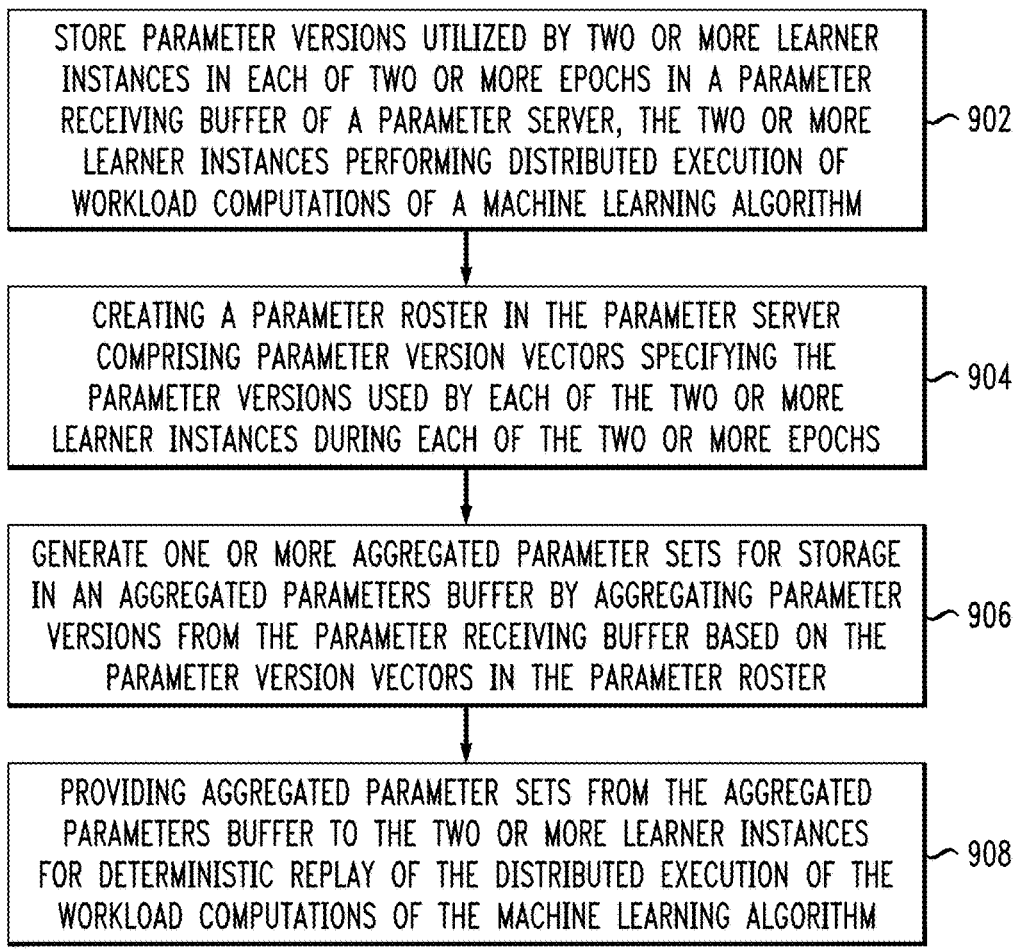
FIG. 9 depicts a process for deterministic replay of computations, according to an embodiment of the invention.

FIG. 9 shows a process 900 for deterministic replay of distributed execution of workload computations of a machine learning algorithm. The process 900 may be performed by a parameter server such as parameter server 102 in system 100. The process 900 begins in step 902 with storing parameter versions utilized by two or more learner instances in each of two or more epochs in a parameter receiving buffer of the parameter server 102. The two or more learner instances, which may be instantiated by learner modules 140 of client devices 104, perform distributed execution of workload computations of a machine learning algorithm. The data utilized in the distributed execution, such as training data, may be partitioned among two or more learner instances. The distributed execution of workload computations, for example, may include training an image classifier, a machine translator or other computations involving machine learning algorithms.

In each of the two or more epochs, the parameter server 102 receives local parameter information from at least one of the two or more learner instances and the parameter server distributes global parameter information comprising one of the aggregated parameter sets to the two or more learner instances. As described above, certain learners may be slow and thus the aggregation of parameter sets may proceed asynchronously. In other embodiments or for certain ones of the epochs, computation may proceed synchronously.

The process 900 continues with step 904, creating a parameter roster in the parameter server 102 comprising parameter version vectors specifying the parameter versions used by each of the two or more learner instances during each of the two or more epochs. In some embodiments, the parameter roster stores at least two valid parameter version vectors for a given epoch. A given parameter version vector for a given epoch specifies a first parameter version computed in a first previous epoch for a first one of the two or more learner instances and a second parameter version different than the first parameter version computed in a second previous epoch for a second one of the two or more learner instances.

In step 906, one or more aggregated parameter sets are generated for storage in an aggregated parameters buffer by aggregating parameter versions from the parameter receiving buffer based on the parameter version vectors in the parameter roster. The parameter receiving buffer may comprise one or more edges connecting received parameter versions for respective ones of the two or more learner instances to corresponding parameter version vectors in the parameter roster. The parameter server may remove edges connecting received parameter sets to corresponding parameter version vectors as the aggregated parameter sets are generated. The parameter server may remove a given parameter set from the parameter receiving buffer when there are no edges connecting the given parameter set to corresponding parameter version vectors in the parameter roster. The aggregated parameter buffer comprises dependencies for respective ones of the aggregated parameter sets identifying which of the two or more epochs in which the two or more learner instances utilize which aggregated parameter sets, and the parameter server removes a given aggregated parameter set from the aggregated parameter buffer after a last epoch in which one of the two or more learner instances utilizes the given aggregated parameter set.

The process 900 concludes with step 908, in which aggregated parameter sets from the aggregated parameters buffer are provided to the two or more learner instances for deterministic replay of the distributed execution of the workload computations of the machine learning algorithm. Step 908 may be performed multiple times for the deterministic replay, e.g., once for each epoch in the deterministic replay.

Figure 10:
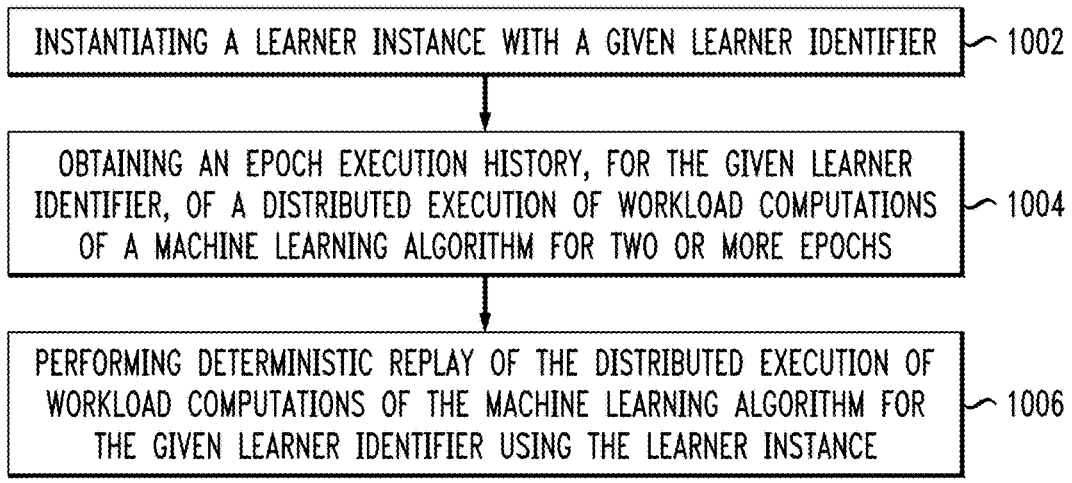
FIG. 10 depicts another process for deterministic replay of computations, according to an embodiment of the invention.

FIG. 10 shows a process 1000 for deterministic replay of distributed execution of workload computations of a machine learning algorithm. The process 1000 may be performed by a learner instance, such as by one of the learner modules 140 on one of the client devices 104. The process 1000 may be executed by multiple learner instances so as to match the number of learner instances used in the prior execution of the distributed execution that is being replayed. The process 1000 begins in step 1002 with instantiating a learner instance with a given learner identifier. In step 1004 an epoch execution history for the given learner identifier is obtained. The epoch execution history specifies parameter version vectors utilized by the given learner identifier in each of the two or more epochs of the prior distributed execution of the workload computations that is being replayed.

The process 1000 continues with step 1006, performing deterministic replay of the distributed execution of workload computations of the machine learning algorithm for the given learner identifier using the learner instance. Step 1006, in some embodiments, involves in each epoch of the epoch execution history obtaining one or more aggregated parameter sets for the given learner identifier for that epoch from one or more parameter servers, performing workload computations for that epoch using the learner instance and the one or more aggregated parameter sets for that epoch, and providing new local parameter information to the one or more parameter servers. The deterministic replay performed in step 1006 may be a synchronous or asynchronous execution of the workload computations by the plurality of learner instances.

In some embodiments, a system comprises one or more parameter servers and two or more learner instances for performing distributed execution of workload computations of a machine learning algorithm for two or more epochs. System 100, for example, shows an implementation with one parameter server 102 and multiple client devices 104 implementing learner instances utilizing learner modules 140.

Each parameter server, such as parameter server 102, is configured to receive parameter versions utilized by each of the two or more learner instances in each of the two or more epochs, to store parameter versions utilized by two or more learner instances in each of the two or more epochs in a parameter receiving buffer, to create a parameter roster comprising parameter version vectors specifying the parameter versions used by each of the two or more learner instances during each of the two or more epochs, to generate one or more aggregated parameter sets for storage in an aggregated parameters buffer by aggregating parameter versions from the parameter receiving buffer based on the parameter version vectors in the parameter roster, and to provide aggregated parameter sets from the aggregated parameters buffer to the two or more learner instances for deterministic replay of the distributed execution of the workload computations of the machine learning algorithm.

Each of the two or more learner instances, which may be implemented by client devices 104 utilizing learner modules 140, is configured to perform deterministic replay of the distributed execution of the workload computations of the machine learning algorithm by obtaining an epoch execution history for a given learner identifier and, in each epoch of the epoch execution history, obtaining one or more aggregated parameter sets for the given learner identifier for that epoch from one or more parameter servers, performing the workload computations for that epoch using the one or more aggregated parameter sets for that epoch, and providing new local parameter information to the one or more parameter servers.

In some embodiments, the system includes multiple parameter servers as discussed above. In such cases, the parameters utilized by the machine learning algorithm are partitioned among the at least two parameter servers while the data utilized in the machine learning algorithm is partitioned among the two or more learner instances. The deterministic replay of the distributed executions of workload computation of the machine learning algorithm performed by the one or more parameter servers and two or more learner instances comprises performing deterministic replay of asynchronous executions of the workload computations by the two or more learner instances. The one or more parameter servers and the two or more learner instances may be provided as software-as-a-service in a cloud environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments can make use of software running on a general-purpose computer or workstation. With reference to FIG. 11, in a computing node 1110 there is a computer system/server 1112, which is operational with numerous other general purpose or special purpose computing system environments or configurations. Examples of well-known computing systems, environments, and/or configurations that may be suitable for use with computer system/server 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1112 may be practiced in distributed cloud computing environments where tasks are performed by remote processing devices that are linked through a communications network. In a distributed cloud computing environment, program modules may be located in both local and remote computer system storage media including memory storage devices.

Figure 11:
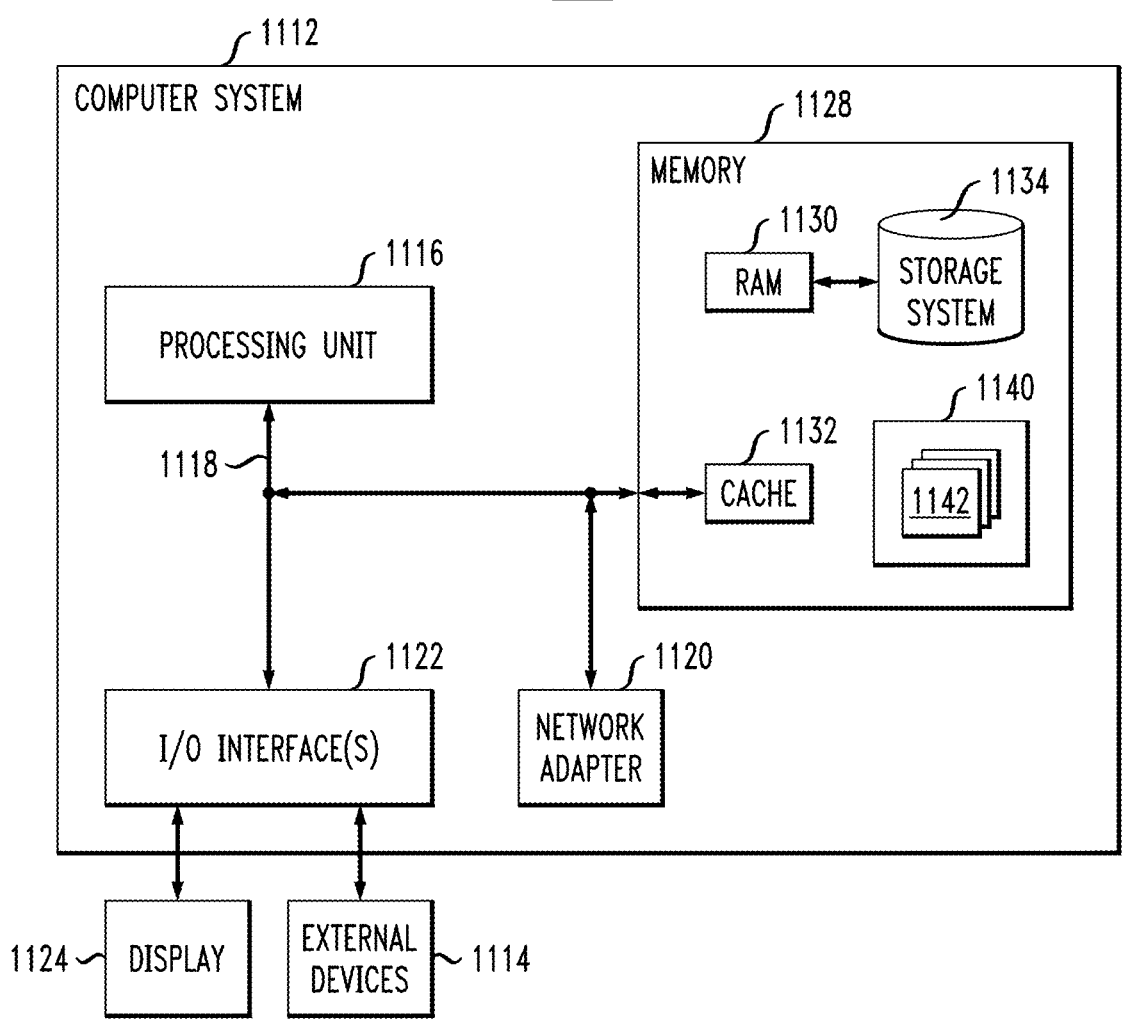
FIG. 11 depicts a computer system in accordance with which one or more components/steps of techniques of the invention may be implemented, according to an embodiment of the invention.

As shown in FIG. 11, computer system/server 1112 in computing node 1110 is shown in the form of a general-purpose computing device. The components of computer system/server 1112 may include, but are not limited to, one or more processors or processing units 1116, a system memory 1128, and a bus 1118 that couples various system components including system memory 1128 to processor 1116.

The bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1112 typically includes a variety of computer system readable media. Such media may be any available media that is accessible by computer system/server 1112, and it includes both volatile and non-volatile media, removable and non-removable media.

The system memory 1128 can include computer system readable media in the form of volatile memory, such as random access memory (RAM) 1130 and/or cache memory 1132. The computer system/server 1112 may further include other removable/non-removable, volatile/nonvolatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1118 by one or more data media interfaces. As depicted and described herein, the memory 1128 may include at least one program product having a set (e.g., at least one) of program modules that are configured to carry out the functions of embodiments of the invention. A program/utility 1140, having a set (at least one) of program modules 1142, may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer system/server 1112 may also communicate with one or more external devices 1114 such as a keyboard, a pointing device, a display 1124, etc., one or more devices that enable a user to interact with computer system/server 1112, and/or any devices (e.g., network card, modem, etc.) that enable computer system/server 1112 to communicate with one or more other computing devices. Such communication can occur via I/O interfaces 1122. Still yet, computer system/server 1112 can communicate with one or more networks such as a LAN, a general WAN, and/or a public network (e.g., the Internet) via network adapter 1120. As depicted, network adapter 1120 communicates with the other components of computer system/server 1112 via bus 1118. It should be understood that although not shown, other hardware and/or software components could be used in conjunction with computer system/server 1112. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
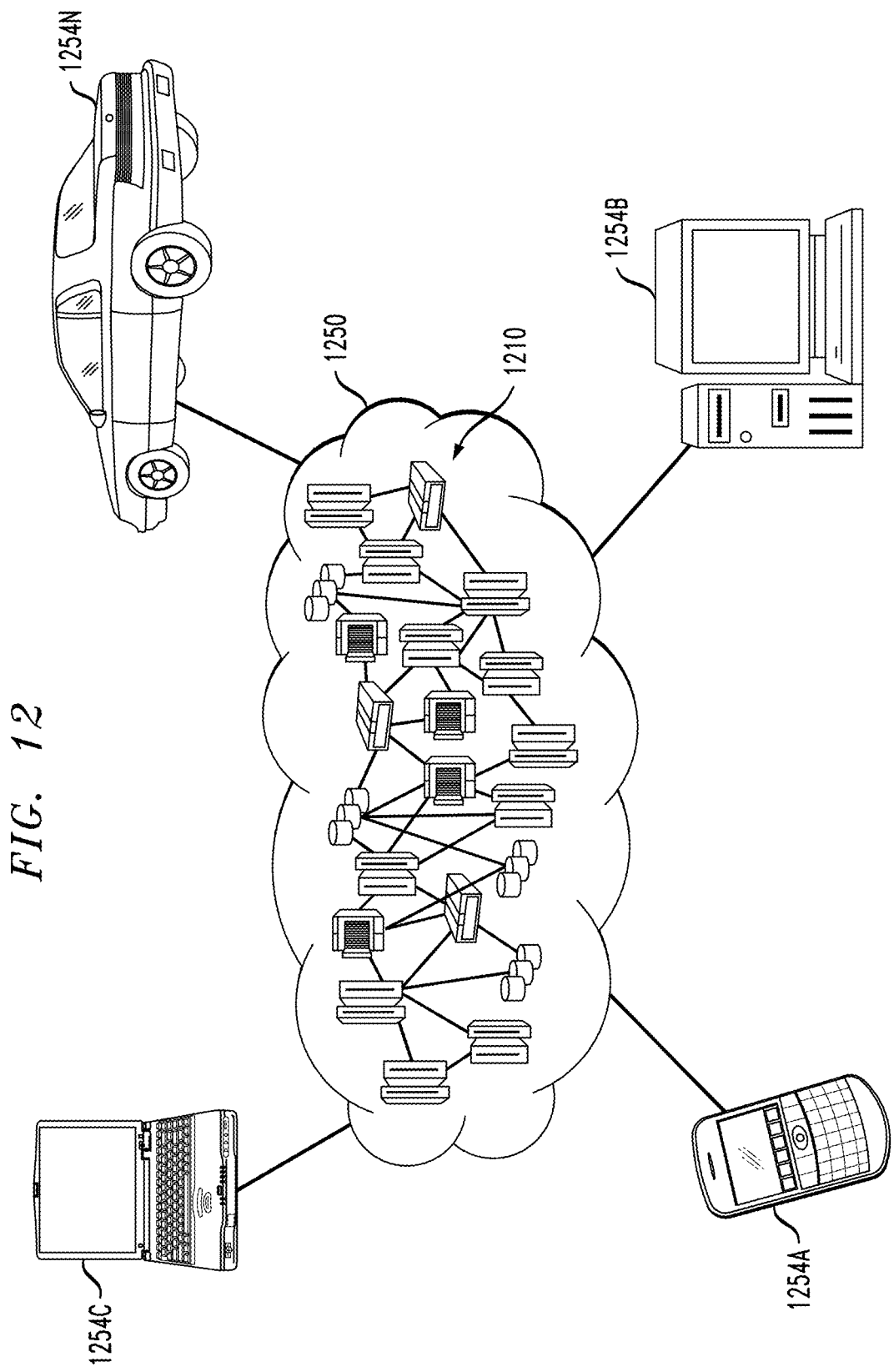
FIG. 12 depicts a cloud computing environment, according to an embodiment of the present invention.

Referring now to FIG. 12, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
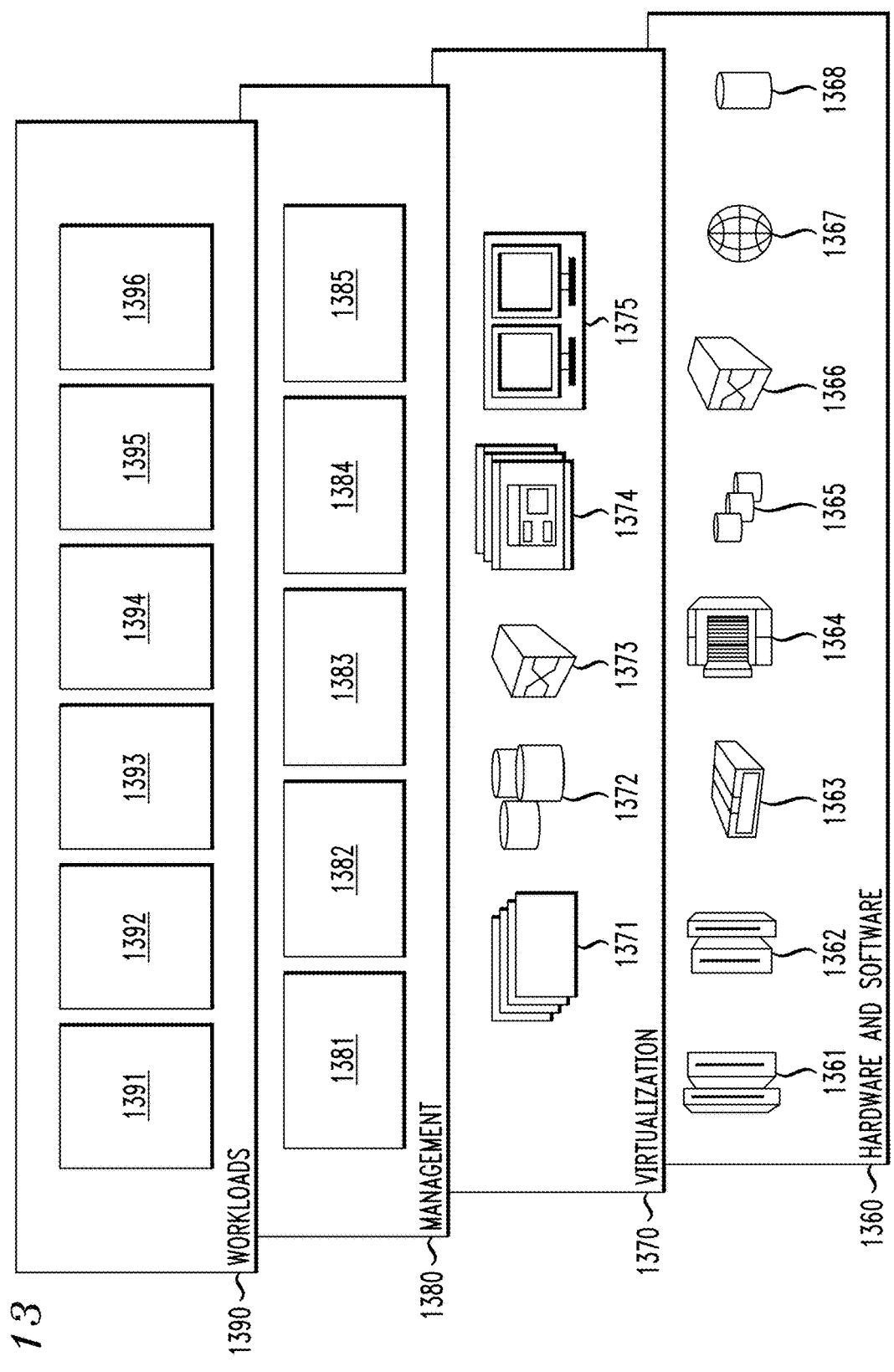
FIG. 13 depicts abstraction model layers, according to an embodiment of the present invention.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and deterministic replay processing 1396, which may perform one or more functions of the parameter server 102 or client devices 104.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    storing parameter versions utilized by two or more learner instances in each of two or more epochs in a parameter receiving buffer of a parameter server, the two or more learner instances performing distributed execution of workload computations of a machine learning algorithm;
    creating a parameter roster in the parameter server comprising parameter version vectors specifying the parameter versions used by each of the two or more learner instances during each of the two or more epochs;
    generating one or more aggregated parameter sets for storage in an aggregated parameters buffer by aggregating parameter versions from the parameter receiving buffer based on the parameter version vectors in the parameter roster; and
    providing aggregated parameter sets from the aggregated parameters buffer to the two or more learner instances for deterministic replay of the distributed execution of the workload computations of the machine learning algorithm;
    wherein a given parameter version vector for a given epoch specifies:

a first parameter version computed in a first previous epoch for a first one of the two or more learner instances; and a second parameter version different than the first parameter version computed in a second previous epoch for a second one of the two or more learner instances.

2. The method of claim 1, wherein:
data utilized in the distributed execution of workload computations of the machine learning algorithm is partitioned among the two or more learner instances; and in each of the two or more epochs, the parameter server receives local parameter information from at least one of the two or more learner instances and the parameter server distributes global parameter information comprising one of the aggregated parameter sets to the two or more learner instances.

3. The method of claim 1, wherein the two or more learner instances perform asynchronous execution of the distributed execution of workload computations of the machine learning algorithm.

4. The method of claim 1, wherein for a given one of the epochs the parameter roster comprises at least two valid parameter version vectors.

5. The method of claim 1, wherein:
the parameter receiving buffer comprises one or more edges connecting received parameter versions for respective ones of the two or more learner instances to corresponding parameter version vectors in the parameter roster; and the parameter server removes edges connecting received parameter sets to corresponding parameter version vectors as the aggregated parameter sets are generated; and the parameter server removes a given parameter set from the parameter receiving buffer when there are no edges connecting the given parameter set to corresponding parameter version vectors in the parameter roster.

6. The method of claim 1, wherein:
the aggregated parameter buffer comprises dependencies for respective ones of the aggregated parameter sets identifying which of the two or more epochs in which the two or more learner instances utilize which aggregated parameter sets; and the parameter server removes a given aggregated parameter set from the aggregated parameter buffer after a last epoch in which one of the two or more learner instances utilizes the given aggregated parameter set.

7. The method of claim 1, wherein the workload computations of the machine learning algorithm comprise training an image classifier.

8. The method of claim 1, wherein the workload computations of the machine learning algorithm comprise training a machine translator.

9. A computer program product comprising a computer readable storage medium for storing computer readable program code which, when executed, causes a parameter server to perform the method of claim 1.

10. An apparatus comprising a parameter server configured to perform the method of claim 1.

11. The computer-implemented method of claim 1, wherein generating a given one of the aggregated parameter sets is performed a designated period of time subsequent to receiving a designated threshold of local parameter updates from a subset of the two or more learner instances performing the distributed execution of the workload computations of the machine learning algorithm.

12. A computer-implemented method comprising:
instantiating a learner instance with a given learner identifier;

obtaining an epoch execution history, for the given learner identifier, of a distributed execution of workload computations of a machine learning algorithm for two or more epochs; and performing deterministic replay of the distributed execution of workload computations of the machine learning algorithm for the given learner identifier using the learner instance;

wherein performing the deterministic replay comprises, in each epoch of the epoch execution history:
obtaining one or more aggregated parameter sets for the given learner identifier for that epoch from one or more parameter servers utilizing a given parameter version vector specifying parameter versions used by the given learner identifier in each epoch of the epoch execution history;

performing workload computations for that epoch using the learner instance and the one or more aggregated parameter sets for that epoch; and providing new local parameter information to the one or more parameter servers; and wherein the given parameter version vector for a given epoch specifies:
a first parameter version computed in a first previous epoch for a first one of the two or more learner instances; and a second parameter version different than the first parameter version computed in a second previous epoch for a second one of the two or more learner instances.

13. The method of claim 12, wherein the given learner identifier comprises one of a plurality of learner identifiers for respective learner instances used in a prior distributed execution of the workload computations of the machine learning algorithm.

14. The method of claim 13, wherein performing the deterministic replay of the distributed execution of workload computations of the machine learning algorithm for the given learner identifier comprises performing deterministic replay of asynchronous executions of the workload computations by the plurality of learner instances.

15. A computer program product comprising a computer readable storage medium for storing computer readable program code which, when executed, causes a client device to perform the method of claim 12.

16. An apparatus comprising a client device configured to perform the method of claim 12.

17. A system comprising:
one or more parameter servers; and
two or more learner instances for performing distributed execution of workload computations of a machine learning algorithm for two or more epochs;

wherein each of the one or more parameter servers is configured:
to receive parameter versions utilized by each of the two or more learner instances in each of the two or more epochs;

to store parameter versions utilized by two or more learner instances in each of the two or more epochs in a parameter receiving buffer;

to create a parameter roster comprising parameter version vectors specifying the parameter versions used by each of the two or more learner instances during each of the two or more epochs;

to generate one or more aggregated parameter sets for storage in an aggregated parameters buffer by aggregating parameter versions from the parameter receiving buffer based on the parameter version vectors in the parameter roster; and to provide aggregated parameter sets from the aggregated parameters buffer to the two or more learner instances for deterministic replay of the distributed execution of the workload computations of the machine learning algorithm; and wherein each of the two or more learner instances is configured to perform deterministic replay of the distributed execution of the workload computations of the machine learning algorithm by:

obtaining an epoch execution history for a given learner identifier; and in each epoch of the epoch execution history:

obtaining one or more aggregated parameter sets for the given learner identifier for that epoch from one or more parameter servers;

performing the workload computations for that epoch using the one or more aggregated parameter sets for that epoch; and providing new local parameter information to the one or more parameter servers; and wherein a given parameter version vector for a given epoch specifies:

a first parameter version computed in a first previous epoch for a first one of the two or more learner instances; and a second parameter version different than the first parameter version computed in a second previous epoch for a second one of the two or more learner instances.

18. The system of claim 17, wherein:

the one or more parameter servers comprises at least two parameter servers;

parameters utilized by the machine learning algorithm are partitioned among the at least two parameter servers; and data utilized in the machine learning algorithm is partitioned among the two or more learner instances.

19. The system of claim 17, wherein performing the deterministic replay of the distributed executions of workload computation of the machine learning algorithm comprises performing deterministic replay of asynchronous executions of the workload computations by the two or more learner instances.

20. The system of claim 17, wherein the one or more parameter servers and the two or more learner instances are provided as software-as-a-service in a cloud environment.

* * * * *